3,766,065
FLAME RETARDANT DISPERSIONS
Dong M. Chay and Paul C. Yates, Wilmington, Del.,
assignors to E. I. du Pont de Nemours and Company,
Wilmington, Del.
No Drawing. Filed Nov. 30, 1970, Ser. No. 93,831
Int. Cl. B27k *3/00;* C09d *5/18;* C09k *3/00*
U.S. Cl. 252—8.1                                    10 Claims

ABSTRACT OF THE DISCLOSURE

Stable dispersions of 3 to 35 percent by weight of colloidal antimony$^{+3}$-titanium$^{+4}$ oxide, the colloidal particles having an average diameter in the range of 2 to 50 millimicrons, in polar organic solvents containing monovalent anions. The mole ratio of antimony to titanium is in the range of about 1.3:1 to 1:3 and the mole ratio of monovalent anion to metal cations is in the range of 0.5:1 to 1.7:1.

The metal oxide sols are prepared in organic solvents by reacting gaseous ammonia with solutions of antimony trichloride and titanium tetrachloride in dimethylformamide, the oxygen source being a stoichiometric amount of water. The precipitated ammonium chloride is removed by filtration. The colloidal oxides can be transferred from DMF into other polar organic solvents to give stable dispersions.

BACKGROUND OF THE INVENTION

There are numerous disclosures in the literature of compositions contaning antimony and titanium which are useful for imparting flame retardant characteristics to polymeric textile materials and films. Thus, H. C. Gulledge and G. R. Seidel, I.E.C. 42, 440–444 (1950), describe an aqueous titanyl-antimonyl chloride complex which is an effective flame retardant for cellulosic materials. This composition is applied in a highly acidic medium to minimize hydrolysis of the chloride groups, since it is desired to react these with the cellulose hydroxyl groups. The formation of hydrous oxides is said to be undesirable, as it results in chalkiness of the finished fabric. I. M. Panik and co-workers, Am. Dyestuff Reporter, 39, 509–516 (1950), describe the use of aqueous solutions of mixtures of antimonyl chloride and titanium chloride-acetate over a range of $Sb_2O_3/TiO_2$ weight ratios from 0.4:1 to 1.9:1, to treat cotton. U.S. Pat. 2,570,566 claims aqueous solutions of titanium and antimony in an inorganic monobasic acid with an atomic ratio of antimony to titanium not exceeding 2:1, the solutions being used to flameproof cellulosic substances by impregnation, followed by precipitation of the oxides with alkali. U.S. Pat. 2,607,729 claims dry aqueous-media-soluble flame retarding compositions of antimony chloride or oxide with titanium oxychloride or tetrachloride, having an antimony to titanium ratio between 1:2 and 2:1. U.S. Pat. 2,668,784, which claims a method for imparting flame resistance to cellulosic material, discloses an acidic aqueous solution of titanium and trivalent antimony oxides diluted with a dissolved volatile, initially stable organic liquid, the atomic Sb/Ti ratio not exceeding 2, said dissolved organic liquid being present in an amount rangeing from 5–70 percent by weight of the solution. U.S. 2,819,173 claims synthetic organic fibers containing finely divided titania, silica, alumina and zirconia and discloses a suspension of aggregates containing 5 to 150 millimicron ultimate particles of titania in dimethyl-formamide, which is incorporated into Orlon® to improve the mechanical properties.

Most of the antimony-titanium compositions used heretofore for flameproofing textiles have been applied to the fibers or fabric in solution and then insolubilized by subsequent precipitation, often with an alkaline reagent. This has the disadvantage that the flameproofing material is on the surface of the fibers, usually as a coarse precipitate, which adversely affects the appearance of the material and much of which is easily removed on laundering. Attempts to incorporate insoluble materials such as oxide directly into the fibers by spinning have not been successful due to the coarseness of the particles, which detract from the esthetic appeal of the fibers or fabric, and which have caused difficulties in the manufacturing process, such as the plugging of the spinnerettes. Colloidal oxides, which have been used in the past, such as those described in U.S. 2,819,713, have not been stable to particle growth and flocculation or aggregation.

There is a need for a flameproofing composition which can be mixed with organic polymers prior to spinning fibers or casting films, which will impart permanent flame-resistance and not adversely affect the appearance or physical properties of the material. These requirements are met by the stable dispersions of novel colloidal antimony-titanium oxide in polar organic solvents, which we have discovered. These sols consist of particles below the light scattering size and are compatible with many polymers such as polyacrylonitrile, copolymers of acrylonitrile with vinyl chloride and vinylidene chloride, polyamides, polyuerthanes, polyacrylates, polyvinyl chloride and acrylonitrile-butadiene-styrene copolymers which are soluble in polar organic solvents. The stable mixtures can be made into shaped articles such as fibers and films or foams by conventional procedures, and the resulting products possess a high degree of permanent flame resistance.

SUMMARY OF THE INVENTION

This invention relates to stable dispersions comprising 3 to 35 percent by weight of colloidal antimony$^{+3}$-titanium$^{+4}$ oxides, the colloidal particles having an average diameter in the range of 2 to 50 millimicrons, in polar organic solvents containing monovalent anions. The mole ratio of antimony to titanium is in the range of about 1.3:1 to 1:3 and the mole ratio of monovalent anion to metal cations is in the range of 0.5:1 to 1.7:1. The dispersions are useful for imparting flame resistance to shaped articles, such as fibers, films and foams made from polymer solutions in polar organic solvents.

DESCRIPTION OF THE INVENTION

Organosols

The stable dispersions of the invention comprise 3 to 35 percent by weight of colloidal trivalent antimony-titanium oxide, in a polar organic solvent containing monovalent anions. For convenience, the concentration is expressed as the total percent metal oxide calculated as $Sb_2O_3$-$TiO_2$.

The sols are transparent, yellow in color, and their stability is such that they do not flocculate or gel over a period of several weeks or months at room temperature. They are also sufficiently stable at elevated temperatures, e.g., 100-120° C., to permit spinning and casting of polymer films.

Dispersions of colloidal trivalent antimony oxide in polar organic solvents have limited stability and become turbid upon aging at room temperature for several days, due to growth and flocculation of the antimony oxide particles. We have found that sols comprising a novel combination of colloidal antimony and titanium oxides in polar organic solvents, prepared in the manner described later, have greatly enhanced stability and remain clear for many weeks or months at ambient temperatures. The mole ratio of antimony to titanium must be less than 1.3:1 to achieve a stability of several weeks, and mole ratios of antimony to titanium of 1:1 or less are necessary in order to achieve stabilities of six months to a year or more. Although sols with ratios as low as 1:10 have excellent stability, sols with molar ratios above 1:3 are preferred from the standpoint of their intended use as flame retardant additives. A mole ratio of antimony to titanium of about 1:1 is most preferred, since such a composition combines both practical storage life and sufficient antimony oxide content for effective and economic use of the sols as flame retardant additives. The concentration of titanium and antimony in the sols, from which the mole ratio is calculated, can be determined by standard gravimetric analytical procedures, or, most conveniently, by atomic absorption spectroscopic analysis.

The colloidal particles of the antimony-titanium oxide sols are believe to carry a net negative charge and are compatible with negatively charged polymers such as polyacrylonitrile. Thus they can be added to solutions of such polymers in polar organic solvents without flocculation occurring, and fibers or films made from the resulting dispersions are not delustered. A freshly prepared sol of antimony oxide in which the colloidal particles are positively charged flocculates almost immediately when added to a solution of a negatively charged polymer, and fibers or films made from these mixtures are delustered.

The upper limit of total metal oxide concentration in the dispersions of the invention is about 35 percent by weight, since at higher concentrations it is difficult to prepare sols having adequate stability. A preferred sol of the invention contains about 18% $Sb_2O_3$ and about 9% $TiO_2$ (approximately equimolar amounts of Sb and Ti). Such a dispersion is stable at room temperature for over six months, is high in antimony oxide component, and is compatible with solutions of polymers, such as acrylonitrile, in polar organic solvents, such as dimethylformamide (DMF). Dilute sols of antimony oxide in polar organic solvents are relatively stable, and the greatly improved stability of the sols of the invention is of less practical significance at total metal oxide concentrations below about 3 percent. From the standpoint of their use as flame retardants, concentrations of at least 10 percent of the metal oxide constituents are preferred.

Antimony-titanium oxide dispersed phase

The dispersed oxide phase is belived to be a novel composition of antimony, titanium and oxygen, rather than a mixture of the oxides. For comparison, evaporation of the solvent from a coloidal dispersion of trivalent antimony oxide in a polar organic solvent, such as dimethylformamide, gave a white solid residue identifiable by X-ray diffraction analysis as antimony trioxide. The solid, off-white residue similarly obtained from a titanium oxide sol in dimethylformamide was amorphous when examined by X-ray diffraction, probably because of the fine particle size. The sols of the invention are bright yellow to orange in color, suggesting an interaction between the two oxides, and evaporation of the solvent under reduced pressure gives yellow or orange-colored residues. X-ray examination shows this solid residue to be crystalline, but the measured "d" spacings do not correspond to antimony trioxide or titanium dioxide or a mixture of the two, as is apparent from the following tabulation.

"$d$" Spacings for Antimony Trioxide, Titanium Dioxide and Their Mixtures as Compared with the Dispersed Antimony-Titanium Oxide Phase of the Invention

| Type of material | Crystalline system | Type of radiation | $d$ A. | $I/I_1$ | ASTM Index No. of the powder diffraction file 1969 |
|---|---|---|---|---|---|
| Antimony trioxide, $Sb_2O_3$ (Senarmontite). | Cubic | Cu Kα ($\lambda$=1.5405 A. Ni filter) | 3.22<br>1.97<br>2.79<br>1.68<br>6.44 | 100<br>42<br>40<br>35<br>12 | 5-534 |
| Antimony trioxide, $Sb_2O_3$ (Valentinite). | Orthorhombic. | do | 3.14<br>3.12<br>3.49<br>1.81<br>4.57 | 100<br>75<br>25<br>20<br>17 | 11-689 |
| Titanium dioxide, $TiO_2$ (Anatase). | Tetragonal | do | 3.51<br>1.89<br>2.38<br>1.70<br>1.67 | 100<br>33<br>22<br>21<br>19 | 4-477 |
| Titanium dioxide, $TiO_2$ (Rutile). | do | do | 3.25<br>1.69<br>2.49<br>2.19<br>1.36 | 100<br>50<br>41<br>22<br>16 | 4-551 |
| Titanium dioxide, $TiO_2$ (Brookite). | Orthorhombic. | do | 3.51<br>2.90<br>3.47<br>1.89<br>2.13 | 100<br>90<br>80<br>30<br>16 | 16-617 |
| Dispersed antimony-titanium oxide phase of the invention. | | do | 2.74<br>4.32<br>2.99<br>2.82<br>2.14 | 100<br>30<br>15<br>12<br>12 | |

A yellow to orange color develops spontaneously when two separate sols of antimony oxide and titanium oxide in DMF are mixed together to obtain a stable antimony-titanium oxide sol. It is observed that for sols with the same molar ratio of antimony to titanium, the intensity of the color increases with the metal oxide concentration. For sols having the same total antimony-titanium oxide concentration but with different molar ratios of antimony titanium, the sols having a 1:1 molar ratio develop the most intense color.

Antimony-titanium oxide particle size

In order to obtain stable dispersions of antimony-titanium oxide which can be incorporated in polymer fibers or films without delustering them due to light scattering, the colloidal oxide particles must have an average diameter of less than 50 millimicrons, preferably less than 20 millimicrons, and they must be substantially nonaggregated. The lower size limit of the ultimate particles is determined by the rate of particle growth during their preparation. Since the initial growth rate of the oxide nuclei is quite rapid, it is difficult to obtain stable dispersions in which the ultimate particle diameter is less than about 2 millimicrons.

The particle size of the dispersed oxides is determined from electron micrographs obtained by examining the sol at 50,000× magnification. A small amount of the sol is diluted to a concentration of about 0.5% with DMF, placed on a copper grid of 0.125" diameter with a thin film of carbon. The sol is dried at room temperature and is examined under an electron microscope. The ultimate sol particles range from 2 to 20 millimicrons. They are approximately equiaxial in shape, and are almost completely nonaggregated. However, occasionally a few aggregates as large as 50 millimicrons have been observed.

The size of the oxide particles is particularly important when they are used as flame retardant additives, since, in addition to not delustering polymer fibers and films, the fine particles of the invention do not adversely affect mechanical strength or spinnability and they exhibit high flameproofing efficiency.

Polar organic solvents

The dispersions of the invention contain polar organic solvents. These solvents will generally have dielectric constants greater than 10 and preferably greater than 30, since it is difficult to prepare stable sols in solvents of low dielectric constant and many of the polymers used in spinning fibers are insoluble in such solvents. The solvents should also dissolve polar organic polymers such as polyacrylonitrile and give solutions from which fibers may be spun or films cast. Examples of suitable solvents are formamide, methylformamide, dimethylformamide, dimethylacetamide, dimethylsulfoxide, dimethylsulfate, tetramethylurea, formic acid, ethylene glycol, diethylene glycol, glycerol, N-methyl-2-pyrrolidone. The preferred solvents are dimethylformamide, dimethylacetamide, and dimethylsulfoxide. Dimethylformamide is most preferred, since this solvent is convenient to prepare the dispersions of the invention by reacting ammonia with solutions of antimony and titanium chlorides, and precipitating ammonium chloride. Dispersions in other polar solvents can be obtained by the addition of solvents with higher boiling points than dimethylformamide, and removing the latter by fractional distillation under reduced pressure or by recovering the solids by evaporation of the dimethylformamide under reduced pressure and redispersing the residue in the desired solvent. It is also possible to carry out the preparation directly in other solvents in which ammonium chloride is insoluble and the metal chlorides are soluble and non-reactive.

The dispersions may contain up to 5 percent water, but it is preferred that the water content be less than 2 percent, and substantially anhydrous dispersions are most preferred, i.e., containing less than 0.01 percent water.

Monovalent anions

A typical method of preparation of the dispersions of the invention consists of precipitating ammonium chloride from solutions of antimony and titanium chlorides in dimethylformamide, removing the ammonium chloride and then mixing the two sols. In order to obtain stable sols, it has been found to be necessary to maintain a concentration of monovalent anion in the dispersions of at least 0.5 mole per mole of metal cations present. In many applications of the dispersions a high level of monovalent ions is undesirable, because of equipment corrosion problems with chloride, or adverse effects on the organic polymer. Therefore, the upper limit is about 1.7 moles of monovalent anion per mole of metal cations, with a preference for less than 0.75. Chloride ions may be replaced by other monovalent ions, such as nitrate, formate, acetate, hydroxyacetate, and mono- or dichloroacetate, and this may be done either prior to precipitating all the chloride ions as ammonium chloride, or by treating a chloride ion containing dispersion with an appropriate anion exchange resin. From the standpoint of the stability of the dispersions, chloride ion is preferred, since even at the highest ratio of 1.7 moles per moles of metal cations, of other monovalent ions, flocculation usually occurs after a few weeks and the sols become turbid.

Process of the invention

The sols are prepared by reacting gaseous ammonia with a solution of SbCl₃ and TiCl₄, in DMF containing a stoichiometric amount of water to provide sufficient oxygen to be able to form the metal oxides, $Sb_2O_3$ and $TiO_2$. The precipitated ammonium chloride is removed by filtration, and the mixed oxides are recovered as a colloidal dispersion in DMF. The colloidal oxides can be transferred from DMF to have stable dispersions in other polar organic solvents. A fraction of the chloride anion from the reactants is not removed in the process, and in present in the final sol. Other monovalent anions may be substituted for chloride, using ion exchange resins, for example.

A stable dispersion of the invention may be prepared as follows: Antimony trichloride is dissolved in DMF containing 1.5 moles of water per mole of antimony. Ammonia gas is bubbled into the solution, which is maintained at a temperature between 15–40° C., with vigorous agitation, until about 2 moles of chloride per mole of antimony are precipitated in the form of ammonium chloride, which is removed by filtration. The filtrate is recovered as a clear and colorless sol. The reaction is represented by the following equation:

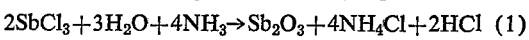

$$2SbCl_3 + 3H_2O + 4NH_3 \rightarrow Sb_2O_3 + 4NH_4Cl + 2HCl \quad (1)$$

A titanium oxide sol in DMF is prepared in a similar manner using titanium tetrachloride. Titanium tetrachloride is dissolved in DMF containing two moles of water per mole of titanium, and ammonia is bubbled into the solution, which is maintained at a temperature between 15–40° C. with vigorous agitation, until about 3 moles of chloride per mole of titanium are precipitated in the form of ammonium chloride which is removed by filtration, and the sol filtrate is recovered. Equation 2 describes this reaction:

$$TiCl_4 + 2H_2O + 3NH_3 \rightarrow TiO_2 + 3NH_4Cl + HCl \quad (2)$$

The two sols prepared as described above are then mixed together to obtain a stable sol of antimony-titanium oxide in which about one mole of titanium per mole of antimony is present as a stabilizer and one mole of chloride ion is present per mole of metal cations.

Alternatively, titanium tetrachloride containing sufficient water can be added to a previously prepared antimony oxide sol in DMF, followed by passing gaseous ammonia into the mixture, to precipitate ammonium chloride. The precipitate is removed by filtration, and the filtrate is a stable antimony-titanium oxide sole in DMF.

Furthermore, a DMF solution of titanium tetrachloride can be added to a DMF solution of antimony trichloride, followed by the addition of sufficient water and passing gaseous ammonia into the mixture. The precipitated ammonium chloride is removed by filtration, recovering a stable antimony-titanium oxide sol.

In all the above cases, a portion of the chloride anion is not removed, and at least 0.5 mole of chloride ion per mole of metal cations is present in the resulting sols.

Process conditions

The reaction is carried out at 15–40° C. Since both the solution of the metal chlorides in DMF and the formation of ammonium chloride are exothermic processes, external cooling must be provided. At temperatures higher than about 40° C., satisfactory products are not obtained, particularly with respect to the particle size of the metal oxides. Antimony-titanium oxide sols prepared at elevated temperatures are opalescent, due to the large particle size, and such sols are stable only for a few days at room temperature, before a yellowish-white precipitate of the metal oxides deposits.

The reaction times depend upon the type of agitation, the degree of dispersion of ammonia gas, and the cooling efficiency. High local concentrations of ammonia due to inadequate agitation or dispersion can cause gelling. Inadequate cooling results in a high reaction temperature, which results in loss of ammonia and solvent and precipitation of the metal oxides. High reaction temperatures can also produce very dark colored dispersions, which are undesirable for many applications.

Extent of reaction

It is important not to remove all the chloride from the DMF solution of metal chlorides. Upon further addition of ammonia to a dispersion in which only about 1 mole of chloride per mole of metal cations is present, the solution becomes viscous and below a ratio of 0.5:1 gelation usually occurs. However, above ratios of 1:1, the residual chloride can be replaced by other anions such as nitrate, formate, acetate and chloroacetate, and the resulting stable dispersions are not viscous.

Replacing residual chloride ions with other anions

To an antimony-titanium oxide dispersion in DMF, containing about one mole of residual chloride per mole of metal cation, is added a sufficient amount of anhydrous acetic acid to provide acetate anions equivalent to the residual chloride ions. The mixture is maintained at a temperature between 15–40° C., and while it is under vigorous agitation, ammonia is passed in, thereby precipitating all the chloride ions as ammonium chloride, which is removed by filtration. The filtrate contains little or no chloride, and is a stable dispersion containing acetate anions.

The residual chloride ions in an antimony-titanium oxide dispersion in DMF can also be replaced with other anions by using ion exchange resins. Thus a dispersion containing one mole of residual chloride per mole of metal cations can be treated with an anionic ion exchange resin in the nitrate form, resulting in the substitution of nitrate ions for the chloride ions. Such a sol is, however, stable only for a few days, after which a white precipitate is deposited.

Replacing DMF with other polar organic solvents

The antimony-titanium oxide dispersions can be prepared in solvents other than DMF by adding a higher boiling polar solvent, such as glycerol, to a DMF dispersion and removing the DMF by fractional distillation at reduced pressure. The DMF is distilled off at about 40° C. under a partial pressure of 0.1 mm. Hg to give an antimony-titanium oxide dispersion in glycerol. The sol is transparent and yellow in color, indicating the presence of the colloidal antimony-titanium oxide, and is also stable at room temperature for over a month. It is obvious that this method of preparing the sol in various solvents is applicable only to those solvents that have boiling points higher than DMF.

Stable antimony-titanium oxide dispersions in polar organic solvents which are more volatile than DMF can be prepared by redispersing in these solvents the solid residue that is obtained by evaporation under reduced pressure of the solvent from a dispersion in DMF.

Utility of the invention

The antimony-titanium oxide dispersions of the invention may be readily incorporated in a variety of organic polymers and the resulting compositions are highly flame resistant. The very small size of the colloidal oxide component makes the dispersions particularly suitable for polymers which are to be spun into fibers or cast into films, since the antimony-titanium oxide particles do not scatter light and therefore do not deluster the fibers or films. The entrapment of the colloidal metal oxides within the polymer material results in a treatment which is resistant to laundering, and therefore the materials are permanently flame-resistant, as opposed to dip treatments of finished fabrics with flameproofing compositions.

Further advantages of the fine oxide particles of the invention, compared with existing flame retardant additives, are that they do not adversely affect other important characteristics of the polymeric materials with which they are incorporated, such as strength and spinnability. An important economic advantage of compositions of the invention is that because of the fineness of the particles and the ease with which they are uniformly dispersed through the polymer, the colloidal oxides are more effective as flame retardants, on an antimony weight basis, than conventional antimony containing flameproofing compositions.

The colloidal particles of the antimony-titanium oxide sols are believed to carry a net negative charge, and they are compatible with negatively charged polymers, such as polyacrylonitrile, copolymers of acrylonitrile with vinyl or vinylidene halides, polyesters, polyamides, polyurethanes, polyacrylates, polyvinyl chloride and acrylonitrile-butadiene-styrene copolymers, which are often spun or cast from solutions in polar organic solvents. Thus the dispersions of the invention can be mixed with solutions of such polymers in polar organic solvents without flocculation occurring and the clear stable solutions can be handled in standard equipment for producing shaped articles, fibers, films or foams.

The amount of colloidal antimony$^{+3}$-titnium$^{+4}$ oxide incorporated into a polymer depends on the nature of the polymer and the degree of flame resistance required, but will generally range between 1% and 30%, calculated as $Sb_2O_3$-$TiO_2$, by weight of the polymer. Loadings below 1% are insufficient to achieve substantial improvements in flame resistance, while amounts in excess of 30% are usually not required even with the polymers most susceptible to burning. Polymers containing organic halogens either as a copolymer or as an additive, such as polyvinyl chloride, tetrabromophthalic anhydride, chlorinated or brominated waxes and terpenes, etc., respond most favorably to the flame retardant action of the colloidal antimony$^{+3}$-titanium$^{+4}$ oxide. For this reason, smaller amounts of antimony compounds are required when used in conjunction with the organic halogen compounds and highly flame resistant polymers can be prepared containing only a few percent of the colloidal antimony$^{+3}$-titanium$^{+4}$ oxide of the invention, measured as $Sb_2O_3$-$TiO_2$, by weight of the polymer in compositions containing organic halogen compounds and from 5% to 20% in the absence of organic halogen compounds.

For example, a sol in DMF can be intimately mixed with a DMF solution of acrylonitrile containing vinylidene or vinyl halides as copolymers. The fibers spun from the composition, which may contain 2–10% by weight of $Sb_2O_3$ based on the polymer, are lustrous, and they are very flame resistant. Fabrics knitted from the fibers are self-extinguishing in the 45° angle burning test (Test Method AATCC 33–1962, as described on pages B–139 to B–142 of the ATCC Technical Manual, 1968 edition, vol. 44, September 1968, published by American Association of Textile Chemists and Colorists, Research Triangle Park, N.C).

The following examples illustrate the manner of making and using the invention. In the examples, parts and percentages are by weight unless otherwise specified.

EXAMPLE 1

An antimony ($Sb^{+3}$) oxide sol in DMF is prepared by reacting antimony trichloride with ammonia and water in dimethylformamide (DMF), thereby precipitating ammonium chloride ($NH_4Cl$) which is removed by filtration. One mole of $SbCl_3$ (228 g.) is dissolved in 2000 g. of DMF in a 4000 ml. glass beaker, to which 1½ moles of distilled water (27 g.) are then added, obtaining a transparent solution. The temperature of the solution is maintained below 25° C. during the dissolution of $SbCl_3$ and water in DMF. While the solution is under vigorous agitation, anhydrous, ammonia is introduced into the solution by bubbling through a 1⁄16″ I.D. glass tube at the rate of 0.8 g. per minute. The resulting chemical reaction is monitored by measuring the pH of the solution using a calomel reference electrode and a Model 7 pH meter, as supplied by Corning Glass Co.

Initially the solution has a pH of 1.30 at 8° C. As ammonia is bubbled in, the pH of the solution increases slowly, and upon reaching a pH of 2.40 at 20° C., a white precipitate is formed. The reaction is permitted to proceed further by adding the ammonia continuously, and when a pH of 5.2 at 24° C. is reached, the flow of ammonia is stopped. The temperature of the solution is kept below 25° C. during the entire operation described above. The solution is agitated for 10 minutes without the flow of ammonia. The agitation is then stopped and the solution is suction filtered through a "coarse" grade fritted ceramic filter plate, thereby obtaining a fluid filtrate of antimony oxide sol in DMF that is transparent and colorless. A total of 37 g. of ammonia is added, and the amounts of the filtrate and $NH_4Cl$ precipitate are 2050 g. and 105 g., respectively. Analysis of the sol by the atomic absorption method shows 5.61% of antimony, and by potentiometric titration, 1.76% of chloride ion to be present in the antimony oxide sol in DMF. The sol also contains 2.31% water, as determined by the Karl-Fisher technique.

The titanium oxide sol that is used to stabilize antimony oxide sol in DMF is prepared as described below:

One mole of $TiCl_4$ (190 g.) is dissolved slowly in 1150 g. of DMF in a 2000 ml. glass beaker under agitation. The solution is cooled continuously as the titanium tetrachloride is added to the DMF, so that the temperature does not rise above 30° C. Two moles of distilled water (36 g.) is then mixed with the solution, resulting in a transparent liquid of pale yellow color. As in the preparation of the antimony oxide sol in DMF, anhydrous ammonia is bubbled into the $TiCl_4$/DMF solution, which is agitated vigorously, through a 1/16″ I.D. glass tube at the rate of 0.8 g. per minute. The pH of the solution increases slowly, and upon reaching 0.58 at 15° C. from the initial value of 0.50 at 13° C., the formation of a precipitate is observed. With the continual introduction of ammonia the pH is raised to 3.0 at 30° C., at which time the flow of ammonia is stopped and the solution permitted to be agitated for an additional 10 minutes. The temperature of the solution during the entire period of reaction is maintained between 13° C. and 30° C. The solution is then suction filtered through a "coarse" grade fritted ceramic filter plate, obtaining a fluid filtrate of titanium oxide sol in DMF that is transparent and pale brown in color. A total of 55 g. of ammonia is added and 1130 g. of filtrate (titanium oxide sol in DMF) and 157 g. of precipitate ($NH_4Cl$) are recovered. The sol contains 4.31% of elemental titanium, 3.23% of chloride, and 2.85% water.

The antimony oxide sol and titanium oxide sol prepared above are mixed together in the following proportions: To 1500 g. of antimony oxide sol is added 775 g. of titanium oxide sol and the mixture is homogenized by agitating in a 4000 ml. beaker, resulting in a fluid sol in DMF that is transparent and bright yellow. The color of the sol is developed spontaneously as the two sols are mixed together. The resulting antimony-titanium oxide sol in DMF has a pH of 3.9 at room temperature, and contains 3.65% and 1.45% of antimony and titanium, respectively, as determined by atomic absorption. These values correspond to a one to one mole ratio of antimony to titanium.

The sol also contains 2.48% of $H_2O$ and 2.23% chloride, which is equivalent to 1.05 mole of chloride per mole of metal cations. To about half of the sol thus prepared (1140 g.), 300 g. of DMF is added and the diluted sol is distilled under vacuum with continuous agitation at a temperature of 45° C. and under a partial pressure of about 0.2 mm. Hg. Water and DMF are distilled off and when 330 g. of distillate is recovered, the distillation residue is cooled and analyzed. The sol now contains less than 0.5% water, 3.67% antimony, 1.47% titanium, and 2.24% chloride, corresponding to a mole ratio of 0.98:1 for antimony to titanium and 1.05:1 for chloride to metal cations.

The individual particles of the sol range from 2 to 10 millimicrons in average diameter, as revealed by electron micrographs, and they are equiaxial or spherical in shape are are almost completely free of aggregation.

The sol has a long term room temperature storage stability as the physical properties of the sol are not changed in 6 months after it is prepared.

The sol is mixed with a dimethylformamide solution of acrylonitrile copolymerized with about 15% vinyl chloride, and the resulting clear, yellow colored dispersion, which is stable for several days, is used to spin fibers. A fabric knitted from the fibers, which contains about 8% antimony-titanium oxide is not delustered, and is self-extinguishing in the standard 45° angle flame test.

EXAMPLE 2

Antimony oxide and titanium oxide sols in DMF, prepared according to the procedure described in Example 1, are mixed together in the following proportions to give an antimony-titanium oxide sol in DMF. A total of 1000 g. of antimony oxide sol and 857 g. of titanium oxide sol are mixed homogeneously in the manner described in Example 1.

While the mixture is under vigorous agitation and maintained at a temperature between 15–45° C., ammonia is bubbled into it as described in Example 1. Eleven grams of ammonia is added and 35 g. of ammonium chloride is precipitated, which is then removed by filtration. Eighteen hundred ten grams of filtrate is recovered as a stable dispersion of antimony-titanium oxide in DMF. The sol is transparent, bright yellow colored, and has a pH of 3.4 at room temperature. It contains 2.98% of antimony and 1.96% of titanium, corresponding to 0.6 moles of antimony per mole of titanium. It also contains 1.20% chloride, which is equivalent to 0.52 mole of chloride per mole of metal cations.

Electron micrographs show the indivdual particles of the sol range from 2 to 20 millimicrons in average diameter, with a few aggregates up to 50 millimicrons in diameter. The sol is stable for at least three months at room temperature.

The sol is mixed with a dimethylformamide solution of 80 wt. percent acrylonitrile copolymerized with 20 wt. percent vinylidene chloride in amount sufficient to provide 8% by weight $Sb_2O_3$, based on polymer. The resulting dispersion, which is stable for several days, is used to cast clear, lustrous films which are self-extinguishing in the standard 45° angle flame test.

EXAMPLE 3

Antimony oxide and the titanium oxide sols in DMF, prepared according to the procedure described in Example 1, are mixed together in the following proportions to make an antimony-titanium oxide sol in DMF containing acetate ions. A total of 950 g. of antimony oxide sol is mixed homogeneously with 650 g. of titanium oxide sol and 64 g. of acetic acid. The mixture is maintained at temperatures between 15–40° C., and ammonia is introduced with vigorous agitation, as described in Example 1. A total of 10 g. of ammonia is added and 57 g. of ammonium chloride are precipitated. The ammonium chloride is removed by filtration, and the filtrate is a stable, clear sol which is yellow in color, and has a pH of 3.9 at room temperature. It contains 1.77% titanium and 3.28% antimony, which is equivalent to 0.74 mole of antimony per mole of titanium. Analysis shows that there is less than 0.1% chloride present in the sol and the amount of acetate ions found in the sol by titration (Scott's Standard Method of Chemical Analysis, by Wilfred W. Scott, N. H. Furman, ed.), amounts of 3.96%, which corresponds to 1.08 moles per mole of metal cations.

Electron micrographs show the individual particles of the sol range from 5 to 30 millimicrons in average diameter, with some aggregates up to 50 millimicrons in diameter.

The sol is stable at room temperature for several weeks, after it slowly becomes turbid, and a precipitate of the metal oxides is deposited.

The sol is used to prepare a flame resistant, clear film of acrylonitrile copolymerized with vinyl chloride.

EXAMPLE 4

A sol of antimony-titanium oxide in DMF is prepared as described in Example 2, except that the sol is treated with an anionic ion exchange resin, grade A–580, Ionac Co., in the nitrate form, to remove the chloride ions and replace them with nitrate ions. A total of 1850 g. of the stable antimony-titanium oxide sol prepared as in Example 2 is mixed with 1000 g. of ion exchange resin in the nitrate form. The mixture is permitted to remain in air for 2 hours under gentle agitation, after which time it is filtered, thereby separating 1825 g. of sol from the resin. Analyses show that only a trace amount of chloride remains in the sol, less than 0.1%, and the sol contains 2.1% nitrate ions, corresponding to a mole ratio of nitrate to metal cations of 0.54:1. The elemental analysis also shows 2.86% and 1.87%, respectively, of antimony and titanium to be present in the sol, from which the mole ratio of antimony to titanium is calculated to be 1:1.66.

Electron micrographs show the individual particles of the sol are in the range of 5–30 millimicrons in average diameter, with some aggregates up to 50 millimicrons in diameter.

The sol is stable and remains transparent for about one week at about 25° C. When added to a solution of a 20% vinylidene chloride/80% acrylonitrile copolymer in DMF, a clear solution is obtained which is spun to give highly lustrous fibers containing about 13 percent antimony-titanium oxide uniformly dispersed throughout. A fabric knitted from the fibers has excellent hand and appearance, and does not burn in air in the standard 45° angle flame test.

EXAMPLE 5

A total of 3420 g. of antimony trichloride is dissolved in 8000 g. of DMF in a 22-liter glass flask. To the solution is then added 405 g. of distilled water. The pH of the solution is 1.20. While under vigorous agitation, ammonia is bubbled into the solution in the manner described in Example 1, thereby obtaining an initial white precipitate of ammonium chloride at a pH of 2.1. The solution is cooled to maintain the temperature between 10° and 30° C. As the solution is bubbled with ammonia, the precipitated ammonium chloride is removed continuously by circulating the liquid through a centrifuge filter, and returning the filtrate to the reaction flask. After 1360 g. of the ammonium chloride precipitate is removed in this manner, the flow of ammonia is stopped, and the entire liquid is filtered, recovering a total of 10510 g. of clear, colorless filtrate, and a further 260 g. of ammonium chloride. The pH of the antimony oxide sol is 3.2, the amount of ammonia added is 545 g., and the sol contains 16.5% antimony and 5.08% chloride.

To 9420 g. of the antimony oxide sol in DMF prepared as above, is added 9380 g. of a solution prepared separately by dissolving 2880 g. of titanium tetrachloride in 7000 g. of DMF while the solution is kept cool under 30° C., then finally by adding 545 g. of distilled water to the solution under agitation. The mixture of antimony oxide sol and $TiSl_4/DMF/H_2O$ solution is agitated vigorously while ammonia is bubbled in, as described in Example 1. The temperature of the solution is maintained between 10° C. and 30° C. When the pH of the solution increases to 1.95 from the initial value of 1.45, ammonium chloride begins to precipitate, and as ammonia is introduced into the solution, the precipitate is continuously removed by centrifuge filtration in the manner described earlier in this example for the preparation of the antimony oxide sol in DMF.

Upon reaching a pH of 3.6 at 20° C., the ammonia flow is stopped and the entire composition is filtered, thereby recovering 16930 g. of a clear, yellow colored antimony-titanium oxide sol in DMF. A total of 710 g. of ammonia is required to precipitate 2310 g. of $NH_4Cl$, and analysis shows that the sol contains 8.72% antimony, 3.76% titanium, 6.15% chloride, and 3.25% water. The mole ratio of antimony to titanium is 0.91 to 1 and the mole ratio of chloride to metal cations is 1.15 to 1. The sol is yellow in color and has similar physical properties and stability to the sol prepared in Example 1.

EXAMPLE 6

One mole of antimony trichloride, 228 g., is dissolved in 100 g. of dimethylformamide (DMF) containing 27 g. of distilled water. To the $SbCl_3/DMF$ solution is then added 3178 g. of $TiCl_4/DMF$ solution prepared by dissolving 3 moles, 570 g., of $TiCl_4$ in 2500 g. of DMF containing 108 g. of distilled water. The solutions are cooled while being prepared, to maintain the temperature between 10° C. and 30° C., and mixed together.

The DMF solution of $SbCl_3$, $TiCl_4$ and water is then agitated vigorously and is bubbled with ammonia in the identical manner described in Example 1. The pH of the solution is 0.8 initially; however, with the addition of ammonia, the pH is increased to 1.6, and the solution becomes turbid due to the formation of ammonium chloride precipitate. When a pH of 3.6 at 24° C. is reached, the flow of ammonia is discontinued, and the solution is permitted to stir for an additional ten minutes. Finally, the solution is filtered under vacuum using a "coarse" grade ceramic filter plate to remove the ammonium chloride, thereby recovering 3970 g. of a yellow colored sol of antimony-titanium oxide sol in DMF. A total of 218 g. of ammonia is added to precipitate 670 g. of ammonium chloride. The sol contains 3.09% Sb, 3.57% Ti, 2.21 Cl, and 1.09% water, corresponding to mole ratios of antimony to titanium of 1:2.93 and chloride to metal cations of 0.63:1.

The physical properties of this sol are similar to those of the sol prepared in Example 2.

EXAMPLE 7

The antimony-titanium oxide sol in DMF of Example 5 is mixed with glycerol and heated under vacuum, thereby removing substantially all of the DMF, and obtaining a colloidal suspension of antimony-titanium oxide in glycerol.

A sample of 200 grams of the antimony-titanium oxide sol of Example 5 is placed in a 500 ml. flask fitted with a condenser and attached to a source of vacuum. One hundred grams of glycerol is added and the mixture is heated while agitating under vacuum. The residue obtained after distillation at 55° C., 0.2 mm. Hg of vacuum for 1½ hours is 139 g. of an antimony-titanium oxide in glycerol. The sol is yellow and transparent, and contains 12.60% antimony, 5.40% titanium and 9.00% chloride, corresponding to mole ratios of antimony to titanium of 1:1.08 and chloride to metal cations of 1.17:1. The sol is useful as a flame retardant for polyester polymers such as polyethylene terephthalate.

EXAMPLE 8

The solid residue obtained by drying the antimony-titanium oxide sol in DMF of Example 2 is redispersed in dimethylacetamide, thereby obtaining a colloidal suspension of antimony-titanium oxide in dimethylacetamide.

A sample of 100 grams of the antimony-titanium oxide sol of Example 2 is placed in a 500 ml. beaker with a diameter of 6", which is then dried under the reduced pressure of 0.01 mm. Hg at room temperature for 192 hours. The friable, solid residue obtained after the drying is 8.4 g. and is yellow in color. Analyses show that the residue contains 35.1% antimony, 22.9% titanium, 14.2% chloride, and 23.2% oxygen. A sample of 5 g. of the solid residue is dispersed in 50 g. of dimethylacetamide by agitating the mixture at about 40° C. in a beaker, thereby obtaining a sol of antimony-titanium oxide in dimethylacetamide, which is transparent and yellow in color. The sol contains 2.07% titanium, 3.22% antimony, and 1.28% chloride, corresponding to 0.62 mole of antimony per mole of titanium, and 0.52 mole of chloride per mole of metal cations.

The antimony-titanium oxide of the sol remains in suspension for over a week at room temperature, and the films cast from polymers such as acrylonitrile which is copolymerized with vinylidene chloride containing a small amount of the antimony-titanium oxide dispersed in dimethylacetamide, are highly flame resistant.

EXAMPLE 9

An antimony ($Sb^{+3}$)-titanium ($Ti^{+4}$) oxide sol in DMF is prepared according to the procedure described below. Sixteen hundred grams of antimony trichloride is dissolved in 4300 gms. of DMF in a 22 liter flask, to which 190 gms. of distilled water is then added. While the solution is under vigorous agitation, anhydrous ammonia is introduced into the solution by bubbling. The resulting chemical reaction is monitored by measuring the pH of the solution.

Initially the solution has a pH of 1.2 at 23° C. As ammonia is bubbled in, the pH of the solution increases slowly, and upon reading a pH of 2.5 at 18° C., the solution becomes turbid as a result of the precipitate formation. The reaction is permitted to proceed further by adding the ammonia continuously, and when a pH of 2.9 at 16° C. is reached, the flow of ammonia is stopped. The temperature of the solution is kept below 25° C. throughout the introduction of ammonia. The solution is then suction filtered through a "coarse" grade fritted ceramic filter plate. The clear filtrate is again bubbled with ammonia in the manner described above, and the precipitate is again removed by filtration. The procedure is repeated two additional times, recovering 4706 gms. of a clear filtrate which is an antimony oxide sol containing 4.7% chloride.

The titanium oxide sol that is used to stabilize antimony oxide in DMF is prepared as described below:

Twenty-six hundred and three grams of titanium tetrachloride is dissolved in 6000 gms. of DMF in a 22 liter flask. Then 276 gms. of distilled water is added, followed by the addition of 1000 gms. of DMF containing 404 gms. of distilled water to the solution. A preliminary test is made to determine the optimum reaction concentration of $TiCl_4$ in DMF. Based on the test, an additional 7200 gms. of DMF is mixed with the previously prepared $TiCl_4$/DMF solution. As in the preparation of the antimony oxide sol in DMF, anhydrous ammonia is bubbled into the $TiCl_4$/DMF solution. The pH of the solution is initially 0.7 at 20° C., and with the addition of ammonia it reaches 0.5 at 19° C. where the solution becomes turbid. When the pH of 0.4 at 21° C. is reached, the flow of ammonia is stopped and the entire liquid is filtered. The filtrate is again bubbled with ammonia, and the precipitate is removed by filtering the liquid through a "coarse" grade fritted ceramic filter plate. The filtrate is again bubbled with ammonia and after the flow of ammonia is stopped, the precipitate of $NH_4Cl$ is removed as described above. The procedure is repeated three additional times, recovering 14,825 gm. of a titanium oxide sol containing 4.09% Ti and 5.8% Cl and 3.14% $H_2O$. A total of 579 gms. of ammonia is used for this reaction.

The antimony oxide sol and titanium oxide sol prepared above are mixed together in the following portions: To 1888 gms. of titanium oxide sol is added 472 gms. of antimony oxide sol and the mixture is homogenized by stirring at 60° C., resulting in a slightly turbid antimony-titanium oxide sol, which is designated (A). A separate batch of antimony-titanium oxide sol, designated (B), is prepared by mixing 1180 gms. of the titanium oxide sol above and 472 gms. of a different batch of antimony-titanium oxide sol, designated batch (C), which is prepared according to the procedure described below:

Three thousand four hundred twenty grams of antimony trichloride is dissolved in 6000 gms. of DMF in a 22 liter round bottom glass flask. The chloride is added slowly into the DMF over a period of 4 min. while the solution is externally cooled with ice. The temperature of the solution rises temporarily to 50° C. When the solution is cooled to 35° C., 405 gms. of distilled water is added, resulting in a decrease in pH from 1.7 to 0.9. While the solution is under vigorous agitation, anhydrous ammonia is introduced into the solution by bubbling through a 5/32" I.D. glass tube, the tip of which is submerged about 3" below the surface of the solution.

Initially the solution has a pH of 0.9 at 20° C. As the ammonia is bubbled in, the pH of the solution increases slowly and upon reaching a pH of 2.9 at 29° C., a white precipitate is formed. While the ammonia is bubbled in, the precipitated ammonium chloride is removed continuously by circulating the liquid through a centrifuge filter, and returning the filtrate to the reaction flask. When a pH of 2.4 at 25° C. is reached, the flow of ammonia is stopped and the entire liquid is filtered, recovering the clear filtrate. A total of 310 gms. of ammonia is bubbled into the solution over a period of about 5 hours. As previously, the clear filtrate is again bubbled with ammonia and the precipitate is removed continuously in the manner described above. When a pH of 2.9 at 16° C. is reached, the flow of ammonia is stopped and the entire solution is filtered, and 9315 gms. of slightly turbid filtrate containing 18.8% Sb and 9.3% chloride are recovered.

To 9240 gms. of the antimony oxide sol prepared above is added 8308 gms. of $TiCl_4$/DMF/$H_2O$ solution, which is prepared in two portions: (1) dissolve 1451 gms. of $TiCl_4$ in 2500 gms of DMF and add 400 gms. of distilled water, and (2) dissolve 1339 gms. of $TiCl_4$ in 2300 gms. of DMF and add 318 gms. of distilled water. While under agitation, the mixed solution of the sol and $TiCl_4$/DMF is bubbled with ammonia as described previously. Initially, the solution has a pH of 1.45 at 14° C. Upon reaching a pH of 1.95 at 20° C., the solution is filtered continuously as before, and at a pH of 2.5 at 25° C., the flow of ammonia is stopped and the entire solution is filtered. A total of 278 gms. of ammonia is added over a period of 135 minutes. The yellow filtrate is again bubbled with ammonia and the ammonium chloride precipitate is filtered by centrifuging and recirculating the filtrate into the reaction flask. When the pH reaches 3.6 at 20° C., the flow of ammonia is stopped and the entire solution is filtered, thereby recovering a total of 14,002 gms. of clear, yellow filtrate. Three hundred forty grams of ammonia is consumed in a period of 170 minutes. The antimony-titanium oxide sol prepared in this manner, which is designated (C), has 10.9% Sb, 4.0% Ti, and 9.9% chloride.

Finally, the two separate batches of antimony-titanium oxide sols (A) and (B) are mixed together, thus preparing a sol which is yellow but slightly turbid. By filtering, about 11 gms. of precipitate is removed, resulting in a clear sol that contains 3.37% Sb, 3.41% Ti, 3.5% Cl, and 2.22% $H_2O$, corresponding to a mol ratio of 1:2.56 for antimony to titanium and 1:1 for chloride to metal cations. This sol is used in the preparation of acrylonitrile polymer fibers containing titanium modified antimony trioxide particles having a maximum dimension less than 50 millimicrons according to the description which follows.

An acrylonitrile/vinylidene chloride/sodium styrenesulfonate terpolymer is prepared in a 7-liter aluminum reactor equipped with an overflow to maintain constant volume, agitator, thermometer, and an external water jacket to regulate the reaction temperature, the reactor being prefilled with deionized water under a blanket of argon. The temperature in the reactor is brought to and maintained at 35° C. To the reactor are fed continuously the following solutions:

(a) A mixture of 9960 ml. of acrylonitrile, 2264 g. of vinylidene chloride, and 5250 ml. of methanol at the rate of 68.4 g./min.;

(b) A solution of 37.3 g. of potassium persulfate in 7500 ml. of deionized water at the rate of 23.5 g./min.;

(c) A solution of 390 g. of sodium metabisulfite and 0.508 g. of ferrous ammonium sulfate in 7500 ml. of deionized water at the rate of 23.5 g./min.; and (d) A solution of 100 g. of sodium styrenesulfonate in a mixture of 2940 ml. of deionized water and 4250 ml. of methanol at the rate of 47.1 g./min.

Sulfur dioxide is metered into the reaction mixture at a rate sufficient to maintain the effluent from the reactor at a pH in the range of 2.5–3.5. The reaction is allowed to proceed for 2 hrs. under a blanket of argon. The effluent is then collected and the reaction in the effluent is stopped by addition of a 1% solution of the tetrasodium salt of ethylenediaminetetraacetic acid, adjusted to a pH of 3.5. The effluent is then filtered and the collected polymer is washed twice with water, the volume being equal to that of the collected effluent, and twice with acetone in similar volume. The polymer is then dried at 50° C. overnight in a vacuum oven. The conversion of monomer to polymer is 53.4%. Analysis of random samples of the polymer give average results of 1.41 for intrinsic viscosity, 153.6 meq./kg. for acidity, and 17.51% for chloride content (equivalent to 23.9% of vinylidene chloride incorporated into the polymer).

A quantity of 625 g. of the terpolymer is blended into a mixture of 518 g. of dimethylformamide, 855 g. of the antimony-titanium oxide sol prepared above, and 13.2 g. of an alkyl tin mercaptide stabilizer (Thermolite® 31, product of M&T Chemicals Inc.), prechilled to below −30° C. The mixture is allowed to warm up to room temperature with stirring, and is then stored for 4¾ hrs. at 60° C., during which time it dissolves. The solution is then further heated to 117° C. and dry-spun by forcing the solution through a spinneret into an aspiration chamber preheated 149–153° C., in which air preheated to 158–162° C. is constantly circulated. The spinneret employed has 18 orifices, and the bundle of filaments collected has a denier of 140. The filament bundle is drawn 3.5× through boiling water in a one-step drawing process. The resulting fiber is lustrous. A sample of 1 g. of the fiber redissolved in 9 g. of dimethylformamide at 80° C. for 1 hr. is optically clear and transmits 50.2% light having a wave length of 7000 A.

A double knit fabric having a weight of 7.90 oz./sq. yd. is prepared from the drawn filament bundle (employing a "Kamoj Stoll" 14 cut machine), using a Swiss double pique stitch with a stitch setting of 11.5. A finish is applied to the filament bundle prior to knitting and removed by scouring for 15 min. at 70° C. after knitting. The fabric is dried at 140° C. for 20 min. To simulate a dyeing step, the fabric is placed in a solution prepared from 3000 ml. of deionized water and 10 ml. of a 10% solution of a cationic surface active agent and 2.0 g. of sodium sulfate, employing a bath to fabric ratio of 150 ml. of solution per gram of fabric. The fabric is added to the bath at 68–75° C. and slowly brought to the boil over a period of 20 min., after which it is boiled for 2 hrs., rescoured at 70° C. for 15 min., and dried in an automatic dryer for 60 min. The fabric is subjected to the 45° angle burning test (Test Method AATCC 33—1962, as described on pages B–139 to B–142 of the AATCC Technical Manual, 1968 edition, volume 44, September 1968, published by American Association of Textile Chemists and Colorists, Research Triangle Park, N.C.; method modified by maintaining flame impingement until the specimen ignites or for a maximum of 30 seconds). Four attempts to ignite the fabric are made, and on each occasion the fabric fails to ignite even after 30 seconds of flame impingement. A single sample is also found to be self-extinguishing in the vertical flame test (Method 5902 as described in "Textile Test Methods, Federal Specification CCC–T–191b, 15 May 1951," published by the General Services Administration, Business Service Center, Region 3, Washington, D.C.; method modified by drying the fabric more rigorously, i.e., by drying it in air at 105° C. for 30 min.). The calculated metal oxide content of the fiber is 5% antimony oxide/7.32% titanium oxide. It is determined by electron photomicroscopy evaluation that the average particle size of the metal oxide particles in the fiber is less than 50 millimicrons.

We claim:

1. A stable dispersion comprising colloidal antimony$^{+3}$-titanium$^{+4}$ oxide having an X-ray diffraction pattern different from that of the individual oxides or a mixture of them, a monovalent anion selected from the group consisting of chloride, nitrate, acetate, formate, hydroxyacetate, monochloroacetate, and dichloroacetate, and a polar organic solvent, the mol ratio of antimony to titanium being in the range of 1.3:1 to 1:3, the mole ratio of monovalent anion to metal cations being in the range of 0.5:1 to 1.7:1, the colloidal particles having an average diameter in the range of 2–50 millimicrons, and the total metal oxide concentration being in the range of 3 to 35 percent by weight.

2. A stable dispersion as defined in claim 1, the solid phase which exhibits an X-ray diffraction pattern for $CuK_\alpha$ radiation using a nickel filter ($\lambda$=1.5405 A.), showing the following lattice parameter ($d$ A.), relative intensity ($I/I_1$) relationships:

| $d$ A.: | $I/I_1$ |
|---|---|
| 2.74 | 100 |
| 4.32 | 30 |
| 2.99 | 15 |
| 2.82 | 12 |
| 2.14 | 12 |

3. A stable dispersion comprising colloidal antimony$^{+3}$-titanium$^{+4}$ oxide having an X-ray diffraction pattern different from that of the individual oxides or a mixture of them a monovalent anion selected from the group consisting of chloride, nitrate, acetate, formate, hydroxyacetate, monochloroacetate and, dichloroacetate, and an organic solvent selected from the group of dimethylformamide, dimethylacetamide, dimethylsulfoxide, formamide, monomethylformamide, dimethylsulfate, formic acid, ethylene glycol, diethylene glycol, glycerol, N-methyl-2-pyrolidone, and tetramethylurea, the mole ratio of antimony to titanium being in the range of 1.3:1 and 1:3, the mole ratio of monovalent anion to metal cations being in the range of 0.5:1 to 1.7:1, the colloidal particles having an average diameter in the range of 2–50 millimicrons, and the concentration of the metal oxides being in the range of 3 to 35 percent by weight.

4. A stable dispersion as defined in claim 3, the solid phase of which exhibits an X-ray diffraction pattern for $CuK_\alpha$ radiation using a nickel filter ($\lambda$=1,5405 A.), showing the following lattice parameter ($d$ A.), relative intensity ($I/I_1$) relationships:

| $d$ A.: | $I/I_1$ |
|---|---|
| 274 | 100 |
| 4.32 | 30 |
| 2.99 | 15 |
| 2.82 | 12 |
| 2.14 | 12 |

5. A stable dispersion of claim 4 wherein the anion is selected from the group consisting of chloride and nitrate, and the solvent is dimethylformamide.

6. A stable dispersion of claim 4 wherein the anion is selected from the group consisting of chloride and nitrate, and the solvent is glycerol.

7. A stable dispersion of claim 4 wherein the mole ratio of antimony to titanium is in the range of 1:1 to 1:3, and the mole ratio of anion to metal cations is between 0.5:1 and 0.75:1.

8. A stable dispersion of claim 5 wherein the mole ratio of antimony to titanium is in the range of 1:1 to 1:3, and the mole ratio of anion to metal cations is between 0.5:1 and 0.75:1.

9. A stable dispersion of claim 4 wherein the colloidal particles have an average diameter in the range of 2 to 20 millimicrons.

10. A stable dispersion of claim 5 wherein the colloidal particles have an average diameter in the range of 2 to 20 millimicrons.

References Cited

UNITED STATES PATENTS

| | | | |
|---|---|---|---|
| 3,553,132 | 1/1971 | Dunag et al. | 252—8.1 |
| 3,440,259 | 4/1969 | Bungh | 252—8.1 |
| 3,437,591 | 4/1969 | Bungh | 252—8.1 |
| 3,211,762 | 10/1965 | Considine | 252—8.1 |
| 2,570,566 | 10/1951 | Lane et al. | 252—8.1 |
| 2,669,521 | 2/1954 | Bierly | 252—8.1 |
| 2,461,302 | 2/1943 | Trullur et al. | 252—8.1 |
| 2,416,447 | 2/1947 | Laughen et al. | 252—8.1 |

NORMAN G. TORCHIN, Primary Examiner

J. P. BRAMMER, Assistant Examiner

U.S. Cl. X.R.

8—116; 106—15; 117—138